UNITED STATES PATENT OFFICE 2,273,444

PROCESS OF PRODUCING SULPHAMIDES OF ORTHO-DICARBOXYLIC ACID IMIDES

Karl Koeberle, Willy Braun, and Fritz Hanusch, Ludwigshafen-on-the-Rhine, Germany, assignors to General Aniline & Film Corporation, a corporation of Delaware No Drawing. Application October 18, 1939, Serial No. 299,974. In Germany February 15, 1938

8 Claims. (Cl. 260—326)

The present invention relates to ortho-dicarboxylic acid imides which contain sulphonamide groups and a process of producing same. This application is a continuation-in-part of our copending application Ser. No. 254,602, filed February 4, 1939.

We have found that new ortho-dicarboxylic acid imides which contain sulphonamide groups can be prepared by converting orthohalogen carboxylic acids by means of chlorsulphonic acid into the corresponding sulphonic acid chlorides, treating the latter with ammonia or its derivatives and heating the resulting ortho-halogen carboxylic acid sulphonamides with cuprous cyanide.

The simplest case of such a reaction may be represented as follows:

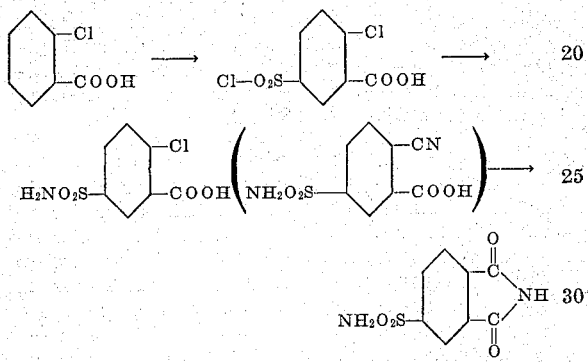

Generally speaking it is unnecessary to separate each individual intermediate compound as such; usually two or more stages of the reaction may be combined in one working operation. As initial materials there may be mentioned in particular ortho-chlorcarboxylic acids, but the ortho-bromo-, ortho-iodo- and ortho-fluoro-carboxylic acids may also be used. The sulphohalides of the ortho-halogen carboxylic acids may be prepared from the sulphonic acids of the ortho-halogen carboxylic acids. Generally speaking, however, it is especially simple and preferable to prepare sulphochlorides of ortho-halogen carboxylic acids by heating the ortho-halogen carboxylic acids with chlorsulphonic acid. From these ortho-halogen carboxylic acid sulphohalides, the ortho-halogen carboxylic acid sulphonamides are then obtained by treatment with ammonia or primary or secondary amines or secondary cyclic bases. This reaction may be carried out without diluents, in many cases also in aqueous suspension. In addition to ammonia itself, all primary and secondary amines of the aliphatic, aromatic, cycloaliphatic and aromatic-aliphatic series may be mentioned; furthermore, secondary cyclic bases such as piperidine or tetrahydroquinoline, and also carbazole and similar compounds having reactive hydrogen attached to nitrogen.

Instead of preparing the ortho-halogen carboxylic acid sulphonamides in the above manner, they may also be prepared by oxidizing sulphamides of cyclic halogen compounds containing in ortho-position to the halogen atom an alkyl or aldehyde group, or by saponifying sulphonamides of cyclic halogen compounds containing in ortho-position to the halogen atom a trihalogen-methyl group. The said saponification of trihalogen-methyl groups is carried out, for example, by heating the compounds containing those groups with diluted sulphuric acid.

In order to convert the ortho-halogen carboxylic acid sulphamides into ortho-dicarboxylic acid imide sulphamides, they are heated with cuprous cyanide. The ortho-cyanocarboxylic acid sulphamides formed intermediately change directly into the ortho-dicarboxylic acid imide compounds under the preparation conditions. In the reaction with cuprous cyanide it is preferable to use substances which render cuprous cyanide soluble in the reaction mixture, as for example pyridine or quinoline. Generally speaking it is possible to obtain the desired result by using the calculated amount of cuprous cyanide. Usually it is unnecessary to start from already prepared cuprous cyanide; it may also be allowed to form in the reaction mixture if desired, as for example by using copper salts and alkali metal cyanides as initial materials at the same time. In this case considerably less than the calculated amount of copper salt may be used.

The new process is especially valuable in the preparation of sulphonamide phthalimides. The yields of ortho-dicarboxylic acid imide sulphonamides are usually very good and the final products are usually very pure; if desired they may be purified by the usual methods, as for example by dissolution and precipitation, recrystallization, sublimation or by way of their salts. The ortho-halogen carboxylic acid sulphonamides and the ortho-dicarboxylic acid imide sulphonamides are new. The latter are useful for the preparation of dyestuffs of the anthraquinone or phthalocyanine series containing sulphonamide groups. Some of them are medicaments and others are intermediates for the production of wetting and dispersing agents.

The following examples will further illustrate how the present invention may be carried out in practice but the invention is not restricted to these examples. The parts are by weight.

*Example 1*

A solution of 100 parts of 2-chlorbenzoic acid in 1000 parts of chlorsulphonic acid is heated for some hours at from 140 to 150° C. while stirring. The mass is allowed to cool, introduced into water and the 2-chlorbenzoic acid-5-sulphochloride which separates is filtered off by suction and washed until neutral. The 2-chlorbenzoic acid-5-sulphochloride thus obtained in about the calculated yield forms, after recrystallization from toluene, colorless crystals and melts at 143° C. It is introduced moist into 1000 parts of 20 per cent aqueous ammonia while cooling; the mixture is stirred for several hours, heated for a short time and acidified with dilute sulphuric acid. The residue is filtered off by suction, washed until neutral and dried. The 2-chlorbenzoic acid-5-sulphonamide thus obtained forms colorless crystals. It may be purified by sublimation under reduced pressure.

100 parts of 2-chlorbenzoic acid-5-sulphonamide, 68 parts of pyridine and 42 parts of cuprous cyanide are heated at from 180 to 185° C. until the melt has become solid. Hot orthodichlorbenzene is then stirred in and the phthalimide-4-sulphonamide formed separated by filtration by suction and washing with methanol. The solvent may also be evaporated off, if desired with steam, preferably under reduced pressure. Any copper salts present are removed by treatment with sodium cyanide or hydrochloric acid. The yield is very good and the phthalimide-4-sulphonamide obtained is already quite pure. It forms colorless needles which melt at about 275° C. It is somewhat soluble in water and readily soluble in alkali; by acidifying the alkaline solution it is recovered unchanged.

The corresponding phthalimides can be obtained in a similar way from 2-chlorbenzoic acids containing in the 5-position a sulphonamide radical the hydrogen atoms of which may be replaced by alkyl, cycloalkyl, aryl, aralkyl or heterocyclic radicals.

Example 2

590 parts of 2-brom-benzoic acid-5-sulphochloride (obtainable from 2-brom-benzoic acid and chlorsulphonic acid according to the process described in Example 1) are introduced into a mixture of 2150 parts of water, 200 parts of aniline and 300 parts of crystallized sodium acetate at from 40 to 50° C. while stirring and stirring is continued at the said temperature for from 3 to 4 hours. After cooling the precipitated 2-brom-benzoic acid-5-sulphonic acid phenylamide is filtered off by suction, washed with water several times and then dried.

A mixture of 285 parts of 2-brom-benzoic acid-5-sulphonic acid phenylamide thus obtained, 70 parts of pyridine, 79 parts of cuprous cyanide and 1500 parts of ortho-dichlorbenzene is heated at 170 to 175° C. for about one and a half to two hours until initial material is no longer detectable. After cooling the solvents are removed by steam distillation, the remaining residue is filtered off by suction, washed with strong hydrochloric acid first until free from copper compounds, then with water until neutral and then dried. The phthalimide-4-sulphonic acid phenylamide having the formula

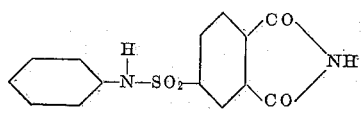

is thus obtained in approximately the calculated yield. After recrystallization from o-dichlorbenzene the melting point of the new compound is 199° C.

Instead of 79 parts of cuprous cyanide a mixture of 31.6 parts of cuprous cyanide and 26 parts of sodium cyanide or a mixture of 87.5 parts of cuprous chloride and 43.5 parts of sodium cyanide may be employed. Furthermore, the same compound may be obtained when 2-iodo- or 2-fluoro-benzoic acid-5-sulphochloride is used as starting material.

If aniline mentioned in the first paragraph of this example is replaced by benzylamine, the 2-brom-benzoic acid-5-sulphonic acid benzylamide is obtained which, after treatment with cuprous cyanide in the manner described in the second paragraph of this example, yields phthalimide-4-sulphonic acid benzylamide, having after recrystallization from trichlorbenzene the melting point of from 237° to 238° C.

Example 3

A mixture of 50 parts of 2-chlorbenzoic acid-5-sulphochloride and 250 parts of benzene is heated at about 60° C. while stirring and 34 parts of piperidine are allowed to drop in within 1 hour. After stirring for about 2 to 3 hours, the mixture is allowed to cool and the deposited compound is filtered off by suction and washed. Purification is performed by dissolving it in an aqueous solution of alkali metal hydroxide and reprecipitating it by means of dilute hydrochloric acid. The melting point of the 2-chlorbenzoic acid-5-sulphonic acid-piperidylamide thus obtained is from 217° to 218° C.

By treating the said 2-chlorbenzoic acid-5-sulphonic acid piperidylamide with cuprous cyanide in the manner described in the foregoing examples the phthalimide-4-sulphonic acid piperidylamide is obtained having after recrystallization from ortho-dichlorbenzene the melting point of from 234° to 235° C.

Example 4

A mixture of 1500 parts of chlorsulphonic acid, 250 parts of 2-chlornaphthalene-3-carboxylic acid and 120 parts of phosphorus pentoxide is heated at from 80 to 90° C. for 3 hours while stirring. The solution thus obtained is allowed to cool and poured into a mixture of ice and common salt while stirring. The precipitated 2-chlornaphthalene-3-carboxylic acid disulphochloride is filtered off by suction and washed with water until neutral. The new compound is mixed while still wet with 10,000 parts of water and 760 parts of a 37 per cent aqueous solution of dimethylamine are allowed to flow slowly into the mixture at from 20° to 25° C. while stirring. After stirring for about 7 hours the solution is filtered; the filtrate acidified with dilute hydrochloric acid and the precipitate formed filtered off by suction, washed with water until neutral and dried. The new compound, a disulphonic acid dimethylamide of the 2-chlornaphthalene-3-carboxylic acid, having after recrystallization from orthodichlorbenzene the melting point of from 251° to 252° C. is thus obtained in approximately the calculated yield.

A mixture of 150 parts of the new compound, 31 parts of pyridine and 35 parts of cuprous cyanide is heated at 170° C., for 3 hours while stirring. The cold melt is pulverized, triturated with strong hydrochloric acid, the resulting white powder filtered off by suction, washed with hydrochloric acid and water and dried. The disulphonic acid dimethylamide of the 2.3-naphthalene-dicarboxylic acid imide thus obtained has a melting point of 300° C. after recrystallization from nitrobenzene.

Instead of pyridine mentioned in the foregoing paragraph quinoline may also be used.

Starting from 2-chlorquinoline-3-carboxylic acid a sulphonic acid dimethylamide of the quinoline-2.3-dicarboxylic acid imide is obtained.

Example 5

A mixture of 25 parts of 2-fluorbenzoic acid and 175 parts of chlorsulphonic acid is heated at from 120° to 130° C. for 4 hours while stirring. After cooling, the solution is introduced into a mixture of ice and common salt while stirring, the separated 2-fluorbenzoic acid-5-sulphochloride is filtered off by suction, washed with water until neutral and then dried.

13 parts of the 2-fluorbenzoic acid-5-sulphochloride thus obtained are introduced in small portions while stirring into a solution of 11.7 parts of monomethylaniline in 40 parts of benzene whereby the temperature of the solution rises to about 50° C. and stirring is continued for 5 hours. After cooling, the separated 2-fluorbenzoic acid-5-sulphonic acid methylphenylamide is filtered off by suction, dissolved in dilute aqueous sodium hydroxide and reprecipitated after filtration by acidifying the filtrate with dilute aqueous hydrochloric acid. The separated compound is filtered off by suction, washed with water until neutral and then dried. It has the melting point of from 170° to 172° C. after recrystallization from benzene.

By treating the 2-fluorbenzoic acid-5-sulphonic acid methylphenylamide with cuprous cyanide in the manner described in the foregoing examples the phthalimide-4-sulphonic acid methylphenylamide corresponding to the formula

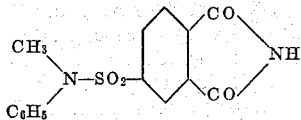

is obtained having after recrystallization from orthodichlorbenzene the melting point of from 238° to 289° C.

Example 6

66.5 parts of diphenylamine are introduced at from 50 to 60° C. into a solution of 50 parts of 2-chlorbenzoic-5-sulphochloride in 150 parts of benzene and the whole is boiled for 3 hours while stirring. After cooling, the separated 2-chlorbenzoic-5-sulphonic acid diphenylamide is filtered off by suction and purified by dissolving it in dilute aqueous sodium hydroxide and reprecipitating it after filtration by means of dilute aqueous hydrochloric acid. The new compound has the melting point of from 222° to 223° C. after recrystallization from chlorbenzene.

A mixture of 50 parts of the 2-chlorbenzoic-5-sulphonic acid diphenylamide thus obtained, 18 parts of cuprous cyanide, 16 parts of pyridine and 600 parts of ortho-dichlorbenzene is boiled for 3 hours while stirring. After working up in the usual manner the phthalimide-4-sulphonic acid diphenylamide is obtained in the calculated yield. It has the melting point of 248° C. after recrystallization from ortho-dichlorbenzene.

If the potassium salt of carbazole is employed instead of diphenylamine, the 2-chlorbenzoic-5-sulphonic acid carbazolylamide is first obtained and then the corresponding phthalimide.

Example 7

A mixture of 50 parts of 2-chlortoluene-5-sulphonamide and 1000 parts of a 20 per cent aqueous solution of sodium hydroxide is heated at from 90° to 95° C. while stirring and a 3 per cent aqueous solution of potassium permanganate is allowed to drop in until potassium permanganate is no longer consumed. After removing a slight excess of potassium permanganate by boiling the mixture with small amounts of alcohol, the separated dioxide of manganese is filtered off by suction and the filtrate after reducing it to half its volume is acidified with dilute sulphuric acid. The 2-chlorbenzoic acid-5-sulphonamide thus separated is filtered off by suction, washed with water until neutral and purified by dissolving it in dilute aqueous sodium carbonate and reprecipitating it by means of dilute aqueous sulphuric acid.

By treating the 2-chlor-benzoic acid-5-sulphonamide with cuprous cyanide in the manner described in Example 1 the phthal-imide-4-sulphonamide is obtained, which is identical with that described in Example 1.

Example 8

50 parts of 2-chlorbenzoic acid-5-sulphochloride are introduced into a solution of 70 parts of dicyclohexylamine in 200 parts of benzene while stirring whereby the said solution heats itself to boiling. The mixture thus obtained is then boiled for 2 hours, the precipitated hydrochloric acid salt of dicyclohexylamine filtered off by suction while hot and the filtrate evaporated to dryness. The remaining 2-chlorbenzoic acid-5-sulphonic acid dicylohexylamide is dissolved in chloroform, the solution thus obtained evaporated after separation of small amounts of insoluble hydrochloric acid of dicyclohexylamine and the residue is triturated with ligroin. The pulverous compound thus obtained is filtered off by suction and dried. It melts at about 150° C. while decomposing.

A mixture of 20 parts of the compound thus obtained, 5 parts of cuprous cyanide and 4.4 parts of pyridine is heated at from 170 to 175° C. for 2 hours while stirring. After cooling the reaction mixture is comminuted, triturated with concentrated hydrochloric acid, the remaining phthalimide-4-sulphonic acid dicyclohexylamine filtered off by suction, washed with water until neutral and dried. The compound has the formula

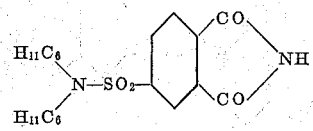

After recrystallization from ethanol the new compound is obtained in form of long thin needles which has a melting point of from 327 to 328° C.

Example 9

Replacing the dicyclohexylamine employed in Example 8 by 52 parts of 1,2,3,4-tetrahydroquinoline and working up in the same manner as described in the first paragraph of Example 8, the 2-chlorbenzoic acid-5-sulphonic acid-1'2'3'4'-tetrahydroquinonylamide is obtained having a melting point of from 164 to 166° C. after reprecipitating it from its solution in dilute aqueous alkali hydroxide by means of dilute aqueous hydrochloric acid. After reacting it with cuprous cyanide in the manner described in the foregoing examples the phthalimide-4-sulphonic acid-1'2'-3'4'-tetrahydroquinolylamide is obtained, melting at 335° C. after recrystallization from ortho-dichlorbenzene.

Example 10

20 parts of 2-iodobenzoic acid-5-sulphochloride (obtained from 2-iodobenzoic acid and chlorsulphonic acid) are introduced into 50 parts of a 20 per cent aqueous solution of methylamine at 0° C. while stirring and then methylamine solution is added at the said temperature in such amounts as to give a clear solution. After stirring the mixture at room temperature for several hours the 2-iodobenzoic acid-5-sulphonic acid methylamide is precipitated by means of dilute aqueous hydrochloric acid, the precipitate is filtered off by suction, washed with water until neutral and dried. The new compound has the melting point of 182° C. After treating it with cuprous cyanide in the usual manner there is obtained the phthalimide-4-sulphonic acid methylamide which has the melting point of from 213 to 214° C. after reprecipitating it from its dilute aqueous alkali hydroxide solution by means of dilute aqueous hydrochloric acid.

Example 11

A mixture of 61 parts of the potassium salt of carbazole, 200 parts of quinoline and 77 parts of 2-chlorbenzoic acid-5-sulphochloride is heated at 150° C. for about 2 hours while stirring. After working up in the usual manner the 2-chlorbenzoic acid-5-sulphonic acid carbazolylamide is obtained as an amorphous powder melting at from 134 to 140° C. while foaming up. By treating it with cuprous cyanide there is obtained phthalimide-4-sulphonic acid carbazolylamide as an amorphous powder.

Using 3-amino-N-ethylcarbazole instead of the potassium salt of carbazole and working as described in Example 8 the 2-chlorbenzoic acid-5-sulphonic acid (N-ethyl carbazolyl-3')-amide is obtained which has the melting point of from 215 to 216° C. after recrystallization from nitrobenzene. After heating 100 parts of the compound thus obtained with 400 parts of nitrobenzene, 25 parts of cuprous cyanide and 22 parts of pyridine at from 180 to 185° C. for 2 hours while stirring, there is obtained after working up in the usual manner the phthalimide-4-sulphonic acid (N-ethylcarbazolyl-3')-amide having the following formula:

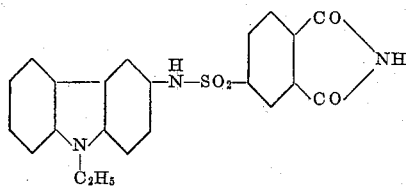

It has the melting point of 238° C. after recrystallization from ethanol.

Example 12

A mixture of 60 parts of 2-chlorbenzoic acid-5-sulphonic acid piperidylamide (obtained according to paragraph 1 of Example 3), 20 parts of cuprous chloride, 14 parts of potassium cyanide and 16 parts of pyridine is heated at from 180 to 185° C. while stirring until initial material is no longer detectable. The melt is then allowed to cool, comminuted and triturated with strong hydrochloric acid; the remaining phthalimide-4-sulphonic acid piperidylamide is filtered off by suction, washed with water and after drying recrystallized from ortho-dichlorbenzene. It is identical with that obtained according to Example 3.

Example 13

510 parts of 2-chlorbenzoic acid-5-sulphochloride (obtained according to Example 1, paragraph 1) are introduced into a mixture of 2200 parts of water, 215 parts of benzylamine and 350 parts of sodium acetate at from 40 to 50° C. and the whole is stirred for about 4 hours at this temperature. After cooling the precipitated 2-chlorbenzoic acid-5-sulphonic acid benzylamide is filtered off by suction, washed several times with water and dried. It melts at from 160 to 165° C.

A mixture of 360 parts of the compound thus obtained, 1560 parts of ortho-dichlorbenzene, 118 parts of cuprous cyanide and 104 parts of pyridine is treated at from 170 to 175° C. for about 2 hours while stirring. After distilling off the diluent with steam the remaining residue is filtered off by suction, washed with strong hydrochloric acid until copper is no longer detectable, subsequently with water until neutral and dried. The phthalimide-4-sulphonic acid benzylamide having the melting point of from 237 to 239° C. after recrystallization from trichlorbenzene is thus obtained in a very good yield.

What we claim is:

1. A process of producing a phthalimide-4-sulphonic acid amide which comprises treating a 2-halogen benzoic acid with chlorosulphonic acid thereby converting it into the corresponding 5-sulphochloride, then treating the said sulphochloride with a nitrogen compound selected from the class consisting of ammonia, primary and secondary alkylamines, aralkylamines, cyclcalkylamines, arylamines, heterocyclic amines and secondary cyclic nitrogenous bases to form the corresponding 5-sulphonic acid amide, and heating this amide with cuprous cyanide.

2. A process of producing a phthalimide-4-sulphonic acid amide which comprises treating a 2-halogen benzoic acid with chlorosulphonic acid thereby converting it into the corresponding 5-sulphochloride, then treating the said sulphochloride with a nitrogen compound selected from the class consisting of ammonia, primary and secondary alkylamines, aralkylamines, cycloalkylamines, arylamines, heterocyclic amines and secondary cyclic nitrogenous bases to form the corresponding 5-sulphonic acid amide, and heating this amide with cuprous cyanide in the presence of an inert diluent.

3. A process of producing a phthalimide-4-sulphonic acid amide which comprises treating a 2-halogen benzoic acid with chlorosulphonic acid thereby converting it into the corresponding 5-sulphochloride, then treating the said sulphochloride with a nitrogen compound selected from the class consisting of ammonia, primary and secondary alkylamines, aralkylamines, cycloalkylamines, arylamines, heterocyclic amines and secondary cyclic nitrogenous bases to form the corresponding 5-sulphonic acid amide, and heating this amide with cuprous cyanide in the presence of an inert diluent and a tertiary cyclic base.

4. A process of producing a phthalimide-4-sulphonic acid amide which comprises treating a 2-halogen benzoic acid with chlorosulphonic acid thereby converting it into the corresponding 5-sulphochloride, then treating the said sulphochloride with a nitrogen compound selected from the class consisting of ammonia, primary and secondary alkylamines, aralkylamines, cycloalkylamines, arylamines, heterocyclic amines and secondary cyclic nitrogenous bases to form the corresponding 5-sulphonic acid amide, and heating this amide with cuprous cyanide in the presence of ortho-dichlorbenzene and pyridine.

5. A process of producing a phthalimide-4-sulphonic acid amide which comprises treating a 2-halogen benzoic acid with chlorosulphonic acid thereby converting it into the corresponding 5-sulphochloride, then treating the said sulphochloride with a nitrogen compound selected from the class consisting of ammonia, primary and secondary alkylamines, aralkylamines, cycloalkylamines, arylamines, heterocyclic amines and secondary cyclic nitrogenous bases to form the corresponding 5-sulphonic acid amide, and heating this amide with a mixture of a copper salt and an alkali metal cyanide in the presence of an inert diluent and a tertiary cyclic base.

6. A sulphamide of phthalimide corresponding to the general formula

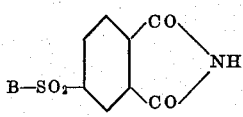

wherein B stands for the radical of a nitrogen compound selected from the class consisting of ammonia, primary and secondary alkylamines, aralkylamines, cycloalkylamines, arylamines, heterocyclic amines and cyclic secondary nitrogenous bases, the said radical being combined by the nitrogen atom with the $SO_2$ group shown.

7. The phthalimide-4-sulphonic acid amide of the formula

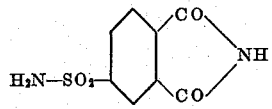

having the melting point of 275° C.

8. The phthalimide-4-sulphonic acid phenylamide of the formula

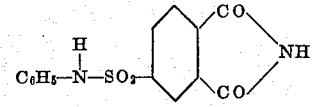

having the melting point of 199° C.

KARL KOEBERLE.
WILLY BRAUN.
FRITZ HANUSCH.